July 14, 1953  B. NEUMANN  2,645,087

SKIRT VALVE SYSTEM FOR HYDRAULIC MASTER CYLINDERS

Filed Oct. 4, 1949

Inventor:
Bernard Neumann

BY Richard Geier
ATTORNEYS

Patented July 14, 1953

2,645,087

UNITED STATES PATENT OFFICE 2,645,087

SKIRT VALVE SYSTEM FOR HYDRAULIC MASTER CYLINDERS

Bernard Neumann, The Hague, Netherlands

Application October 4, 1949, Serial No. 119,458
In France October 8, 1948

11 Claims. (Cl. 60—54.6)

As is well known, hydraulic brake systems, particularly for motor vehicles, comprise a number of wheel brake cylinders associated with the wheels of the vehicle for applying the brakes thereto or disengaging them therefrom, the wheel brake cylinders being connected by appropriate conduits to a master cylinder, the piston of which is foot or hand operated to transmit hydraulic pressure through the conduits to the wheel brake cylinders to operate the system.

The present invention relates to that part of the system which is generalily called the master cylinder because the latter forms the principal component of that part of the system, but which will hereinafter be termed the operating assembly of the system because, as will presently be appreciated, the master cylinder is not always, and is not in the present invention, the only component thereof, since it is frequently found convenient to combine therewith, in a unitary structure or otherwise, certain other components requiring periodical or occasional attention on the part of the vehicle driver.

In such hydraulic brake system operating assemblies it is known to accommodate in a single cylinder structure, in addition to the master cylinder itself, a pump cylinder, the master piston either itself constituting the piston element of the pump or being connected to, or formed in one with, the pump piston so that both move in unison when reciprocated by the driver, usually through a pedal connected thereto. The pump part of the apparatus draws from a liquid reserve tank additional liquid and delivers it to a precompression chamber which, when the brakes are in the "off" positions, communicates with the master cylinder, the object being to ensure that the hydraulic pressure in the whole system, with the brakes "off," shall never fall below a predetermined minimum and that any minor losses of liquid in the system due to leakage or other causes shall be automatically made good.

It has been proposed, in connection with such operating assemblies, to use an air cushion chamber for precompression, i. e., a chamber in which the liquid delivered thereto by the pump compresses a volume of air, whereby the precompression pressure is applied to the liquid in the system, and to provide the chamber with a valve which automatically opens, in the event of liquid in excess of that required to maintain the predetermined precompression pressure is being pumped into the chamber, and allows the excess liquid to be discharged therefrom by overflow. Such an air cushion chamber, if accommodated within the liquid reserve tank itself in order to allow the excess liquid to be readily returned thereto, occupies a relatively large amount of space in the reserve tank, for which reason it has been provided separately from the reserve tank in some prior constructions, although in that case there is the drawback that additional conduits are required. Moreover there has always been the difficulty of finding room for the necessary valve gear associated with the air cushion chamber and the reserve tank, and this has made such air cushion chambers unsuitable for use with operating assemblies of motor vehicle hydraulic brakes where space is particularly restricted owing to the design requirements for motor vehicles.

It is an object of this invention to provide an improved construction of operating assembly with greater economy of space.

Another object of the invention is to render possible the use of air cushion chambers for precompression purposes even when space is limited.

A further object is to provide an improved valve means controlling the delivery passages from the pump to the precompression chamber and if desired a similar valve means controlling the inlet passages from the reserve tank.

It is yet another object to provide a novel multiple purpose element serving as a seal between the precompression chamber and the pump cylinder and as a non-return valve means to control the liquid flow to and from the pump cylinder.

As an additional object of the invention, improvements are to be made in the arrangements for providing for overflow of excess liquid from the air cushion chamber into the reserve tank and for making good any loss of air from the air cushion chamber.

With these objects in view, one feature of the invention consists in the provision, within a cylinder structure including the master cylinder and the pump cylinder, of an annular chamber extending around the cylinder structure, which annular chamber communicates freely with the precompression chamber and serves to accommodate the non-return valve means controlling the delivery passage from the pump cylinder to the precompression chamber. The non-return valve means controlling the inlet from the reserve tank to the pump cylinder may be accommodated within the pump cylinder and located immediately adjacent the annular chamber. The advantage of this arrangement is that without any increase in the size of the reserve tank, which is formed as an integral unit with the cylinder structure, it is possible to store therein a larger quantity of reserve liquid compared with the total volumetric capacity of the brake system, because the necessary valve means takes up no space either in the reserve tank or in the precompression chamber, so that the latter can be made in the form of a relatively small air cushion chamber which can be readily mounted within the reserve tank and which can nevertheless hold an adequate volume of air. Another feature of the invention provides for one or both of the above mentioned non-return valve means to be constituted by a section of hose of a resilient material overlying the ports or passages which they are to control. This feature materially assists in the provision of a compact construction without loss of capacity.

According to a further feature of the invention the two hose sections, which may be reinforced by metal rings form an integral unit having a thickened central portion which is adapted to form a seal between the pump cylinder and one axial end of the annular chamber, the other axial end of which is closed by metallic union with the cylinder structure. This feature thus provides a multiple purpose element serving as a sealing washer and, by reason of flexible annular skirts projecting from the thickened central portion in opposite directions, as valve means for the pump cylinder inlet and delivery ports. A single metal ring may then be embedded in the thickened central portion to act, not only as a reinforcement, but also as a means of locating the element in position in a manner facilitating the assembly of the parts. Preferably, this element is made of three parts namely the metal ring and two hose sections of suitable material, e. g. rubber, each of the two hose sections being thickened at one end by which they are bonded to opposite sides of the metal ring, so that the latter in conjunction with the two adjacent thickened hose ends forms the aforesaid central portion of the element.

Other features of the invention concern the air cushion precompression chamber, which is made of two parts, one forming a fixture on the brake system operating assembly while the other is movable against the action of an adjustable spring so that excess liquid can escape from the chamber simply by lifting the movable part and without provision of any special valve means for this purpose. The movable part preferably takes the form of a domed cover, and by lifting it manually it is possible to make good any loss of air which may have occurred in the air cushion chamber. To facilitate this, the movable cover may be provided with a handle which, with the air cushion chamber disposed within the reserve tank, takes the form of a rod projecting from the cover through the walls, preferably the top, of the reserve tank for manipulation from the exterior of the latter. The foregoing features are also of general value in the control of the air cushion chamber, for example during the operation of refilling the system with liquid to make up for losses, this operation being usually performed by repeated rapid reciprocations of the piston elements.

Other objects, features and advantages of the invention will appear from the following description, given by way of example with reference to the accompanying drawing, of one form of hydraulic brake system operating assembly embodying the invention.

Figure 1:
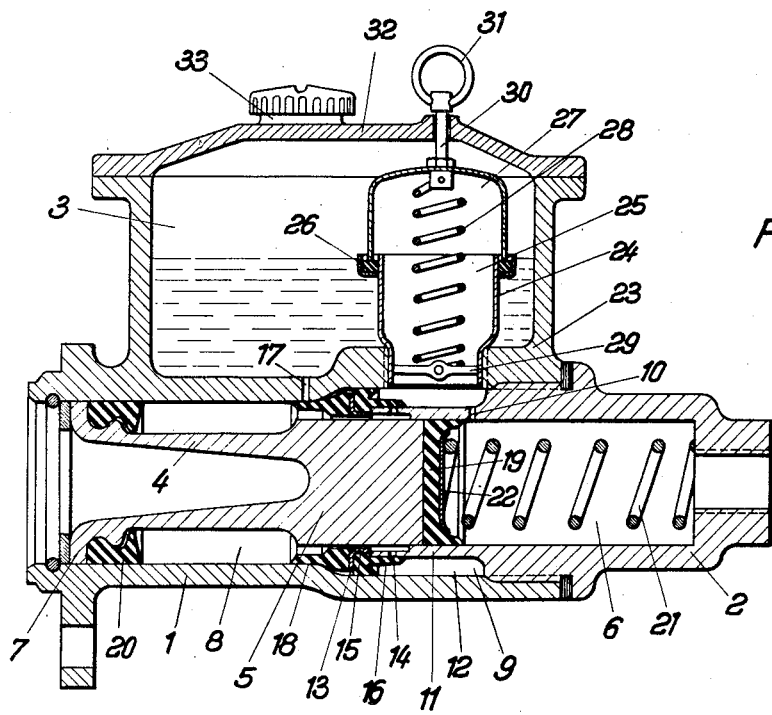
Fig. 1 shows this form of assembly in longitudinal section.

Referring now to the embodiment illustrated in the drawing which is designed for the hydraulic brake system of a motor vehicle, the operating assembly as shown in Fig. 1 comprises a cylinder structure having two parts 1 and 2 with which a liquid reserve tank 3 is combined in a unitary structure by being formed integrally with the cylinder part 1. Reciprocable in the cylinder structure by means of a pedal (not shown) is a piston element 4 which comprises a piston part 5 mounted in a bore 6 of the cylinder part 2, the bore 6 forming the master cylinder proper of the assembly. The element 4 also comprises another piston part 7. This is the pump piston of the assembly which is of larger diameter than the master piston 5 and is mounted in a correspondingly larger pump cylinder bore 8 provided in the cylinder part 1.

The cylinder parts 1 and 2 are so shaped and dimensioned as to form between them an annular precompression chamber 9 extending around the middle of the cylinder structure within its external walls and communicating with the master cylinder 6 through a passage 10 as long as the piston element 4 is in its "brakes off" position in which it is shown in Fig. 1. The chamber 9 is defined mainly by a neck-like extension 11 of the cylinder part 2 and by a slightly enlarged portion 12 of the wall of the cylinder part 1 which closes the chamber 9 at one axial end thereof. The other axial end of the chamber 9 is closed by a composite element 13 which forms a seal between the chamber 9 and the pump cylinder 8 and which will be described in greater detail hereinafter with reference to Fig. 2. The pump cylinder 8 communicates with the chamber 9 through small passages 14 which constitute the delivery ports of the pump and open into a narrow annular space 15 formed between the neck 11 and the piston 5 and constituting a part of the likewise annular pump chamber 8. The passages 14 are controlled by a non-return valve in the form of a flexible hose section 16 surrounding the neck 11 so as to overlie the passages 14. The pump cylinder 8 is in communication with the reserve tank 3 through one or more passages 17 constituting the inlet ports of the pump and controlled by a non-return valve in the form of another flexible hose section 18 applying itself against the inside wall of the bore 8 so as to overlie the passages 17.

The pistons 5 and 7 are provided with the usual packings of known kind to ensure fluid-tight engagement with their respective cylinder bores, namely a cup washer 19 of rubber for the piston 5 and a rubber sealing ring 20 for the piston 7. A main spring 21 is disposed in the master cylinder 6 to return the piston element 4 to the position shown after it has been pedal operated to the "brakes on" position. One end of the spring 21 is supported on a dished washer 22 whilst the other end is supported on the cylinder end wall surrounding the aperture therein which serves for connection to a conduit of the transmission line of the brake system leading to the wheel brake cylinders.

Screwed into an apertured and tapped portion 23 of the bottom of the reserve tank 3, which also forms the upper wall of the annular chamber 9, is a cup shaped sheet metal member 24 which is open at the bottom to communicate freely with the annular chamber 9 and forms the lower or body part of an air cushion chamber 25. The upper rim of the body part 24 is flanged as shown to provide a groove running round the rim and receiving a resilient packing ring 26. A domed cover 27 constitutes a movable upper part of the air cushion chamber 25 and is normally held down in air-tight engagement with the packing ring 26 by a tension spring 28 fixed at its upper end to the cap 27 and anchored at its lower end on a member 29 secured across the bottom of the body part 24. A rod 30 passes through, and is adjustably secured in, the cap 27 to enable the tension of the spring 28 to be adjusted. The rod 30 extends upwardly and into a hole in the top of the tank 3 in which it is guided and from which it projects outside the tank 3 where it is provided with a ring 31 to facilitate manipulation of the rod by means of which the cap 27 can be raised off the body part 24 of the air cushion chamber 25. In the top 32 of the tank there is provided an opening 33 which is normally closed by a screw cap or the like and through which the tank can be replenished.

Figure 2:
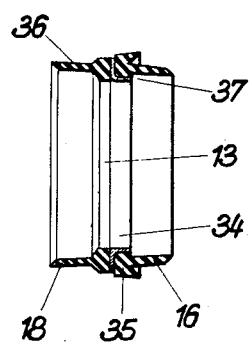
Fig. 2 shows a detail thereof, likewise in longitudinal section.

Referring now to Fig. 2, the composite element 13 consists of a substantially L-section metal ring 34 to which the two hose sections 16 and 18 are attached on either side so as to project axially therefrom in opposite directions. The hose sections 16 and 18 are made of rubber or like suitable resilient material and are securely bonded to the metal ring 34 by vulcanisation or by adhesives. The part of each hose section adjacent the metal ring is thickened as indicated at 35 in respect of the hose section 16, the thickened part of the hose section 18 being somewhat similar in form. The central portion of the element 13, consisting of the two thickened hose parts with the metal ring 34 embedded therebetween, serves as a sealing ring between the chamber 9 and the pump cylinder 8, the outer surface of the thickened part 35 being in fluidtight engagement with the chamber wall 12, as shown in Fig. 1. The parts of the hose sections 16 and 18 remote from the metal ring 34 take the form of thinner flexible skirt portions as indicated in Fig. 2 at 36 in respect of the hose section 18. It is these skirt portions which serve as valves in the manner already described, the inner surface of the hose section skirt 16 and the outer surface of the hose section skirt 18 being seated against the outside of the neck extension 11 and against the inside of the bore 8 respectively so as to overlie the passages 14 and 17 respectively. It will be appreciated that the pump pressure will lift the skirt valve of the hose section 16 off its seat to admit liquid into the annular chamber 9 whilst holding the skirt valve of the hose section 18 on to its seat, and the pump suction will have the reverse effect on the two skirt valves. The inner edge 37 of the metal ring 34 serves as abutment against the adjacent end face of the neck extension 11, as shown in Fig. 1, whereby the metal ring is held in position. The metal ring thus serves the double purpose of reinforcing the composite element 13 and of locating it in the assembly. It will now be apparent that the element 13, complete as shown in Fig. 2, forms a single unit performing the multiple functions of a sealing ring and two valves and is yet small enough to be accommodated, as to the greater part thereof, within the annular chamber 9.

The operation of the assembly is as follows:

The piston element 4 is operated in the usual way to apply the brakes. When it is moved to the right as viewed in Fig. 1, against the action of the main spring 21, i. e. to the "brakes on" position, the pump piston causes the skirt valve of the hose section 16 to be raised off its seat and delivers liquid from the pump cylinder 8 through the passages 14 and through the annular chamber 9 into the air cushion chamber 25. Assuming there to be no leakage from the brake system, the chamber 25 becomes filled with liquid until the air therein beneath the cover 27 is compressed to a predetermined pressure. While the piston element 4 is in "brakes off" position uncovering the passage 10, this pressure is applied and maintained throughout the whole brake system as precompression (compression prior to braking) the value of which is determined by the adjustment of the tension of the spring 28. If the pressure exceeds that tension, owing to liquid in excess of that required to maintain the predetermined precompression pressure being pumped into the air cushion chamber, then the cover 27 is automatically raised off its seat on the packing ring 26 and the excess liquid overflows from the body part 24 of the chamber 25 and is returned to the reserve tank 3, whereupon the cover 27 is drawn down on to its seat again. Every time the piston element 4 is returned to its "brakes off" position, a fresh quantity of liquid is drawn into the pump cylinder 8 from the tank 3 through the passage 17 past the skirt valve of the hose section 18, whilst the skirt valve of the hose section 16 prevents the liquid in the air cushion chamber from being drawn back into the pump cylinder 8. The foregoing process of course occurs each time the brakes are operated. If a loss of liquid has occurred in the system owing to, say, a small temporary leakage, the loss can be made good by repeated rapid reciprocations of the piston element 4 until the system is completely filled with liquid again and the desired precompression pressure is re-established. When the system is first taken into use, the air cushion chamber can be initially filled by hand by pulling up the rod 30 to lift the cover 27 so that the liquid simply overflows from the tank 3 into the body part 24 of the chamber 25. Thereafter the tank 3 is kept filled only to such an extent that the liquid level therein approximately coincides with the lower edge of the cover 27 in the closed position thereof as is shown in Fig. 1 so that air can be admitted into the chamber 25 by manually lifting the cover 27 in the event of any air leakage having occurred therein. Alternatively in case of necessity additional liquid can be admitted into the chamber 25 by pouring some more into the reserve tank and manually lifting the cover 27.

While a preferred embodiment of the invention has hereinbefore been described, it will be apparent to those skilled in the art that many changes can be made in the details of construction and arrangement of the various parts and that other embodiments are also possible without departing from the spirit of the invention; hence, the invention is not to be deemed to be limited to the details shown in the drawing and described in the foregoing, nor otherwise than by the scope of the appended claims.

I claim:

1. In an hydraulic brake system, a master cylinder comprising a reserve tank, a first cylinder, means constituting an inlet passage connecting said reserve tank with said first cylinder, a second cylinder, means forming a precompression chamber and also forming a delivery passage connecting said precompression chamber with said first cylinder, interconnected pistons reciprocable within said cylinders; a valve constituting a seal between said first cylinder and said precompression chamber and comprising a section of hose of resilient material disposed within said first cylinder to overlie said inlet passage and constitute non-return valve means therefor, and a second section of hose of resilient material disposed in said precompression chamber to overlie said delivery passage and constitute non-return valve means therefor.

2. In an hydraulic brake system, a master cylinder comprising a reserve tank, a first cylinder, means constituting an inlet passage connecting said reserve tank with said first cylinder, a second cylinder, means forming a precompression chamber and also forming a delivery passage connecting said precompression chamber with said first cylinder, interconnected pistons reciprocable within said cylinders and a valve comprising an annular element of resilient material having a relatively thick ring portion constituting a seal between said first cylinder and said precompression chamber, a section of hose disposed within said first cylinder to overlie said inlet passage and constitute non-return valve means therefor, and a second section of hose disposed in said precompression chamber to overlie said delivery passage and constitute non-return valve means therefor.

3. In an hydraulic brake system, a master cylinder comprising a reserve tank, a first cylinder, means constituting an inlet passage connecting said reserve tank with said first cylinder, a second cylinder, means forming a precompression chamber and also forming a delivery passage connecting said precompression chamber with said first cylinder, interconnected pistons reciprocable within said cylinders; an annular member of resilient material constituting a seal between said first cylinder and said precompression chamber, a metal reinforcing ring embedded in said member and having portions protruding therefrom to locate said member in said precompression chamber, said passages being located on either side of said member, and flexible skirt portions formed integrally with said member and axially projecting therefrom in opposite directions into said first cylinder and said precompression chamber respectively to overlie said inlet and delivery passages respectively and form non-return valve means therefor.

4. In a hydraulic brake system, a master cylinder comprising a reserve tank, a first cylinder, means constituting an inlet passage connecting said reserve tank with said first cylinder, a second cylinder, means forming a precompression chamber and also forming a delivery passage connecting said precompression chamber with said first cylinder, interconnected pistons reciprocable within said cylinders; an annular element having a central ring portion and two flexible annular skirt portions axially projecting therefrom in opposite directions, said central ring portion constituting a seal between said first cylinder and said precompression chamber, and said skirt portions overlying said inlet and delivery passages respectively to constitute non-return valves controlling the flow of liquid through said passages respectively to and from said first cylinder.

5. In an hydraulic brake system, a master cylinder comprising a reserve tank, a first cylinder, means constituting an inlet passage connecting said reserve tank with said first cylinder, a second cylinder, means forming a precompression chamber and also forming a delivery passage connecting said precompression chamber with said first cylinder, interconnected pistons reciprocable within said cylinders, a valve comprising a metal ring member, two sections of hose of resilient material, said sections being bonded to said ring member on either side thereof and extending axially away from said metal ring member in opposite directions, and each of said hose sections having a relatively thick annular part adjacent said metal ring member and a thinner annular part constituting a skirt portion, said thick annular parts of both said hose sections and said metal ring member constituting a seal between said first cylinder and said precompression chamber, and said skirt portions overlying said inlet and delivery passages respectively to constitute non-return valves controlling the flow of liquid through said passages respectively to and from said first cylinder.

6. In an hydraulic brake system, a master cylinder comprising a reserve tank, a first cylinder, means constituting an inlet passage connecting said reserve tank with said first cylinder, a second cylinder, means forming a precompression chamber and also forming a delivery passage connecting said precompression chamber with said first cylinder, interconnected pistons reciprocable within said cylinders, a valve comprising a metal ring member constituting a wall portion closing an end of said precompression chamber, two sections of hose of resilient material, said sections being bonded to said ring member on either side thereof and projecting axially from said ring member in opposite directions, and each of said hose sections having a thickened portion adjacent said ring member and a relatively thinner flexible skirt portion, the thickened portion of at least one of said sections completing said wall portion closing an end of said precompression chamber and forming a seal between said precompression chamber and said first cylinder, said skirt portions overlying said inlet and delivery passages respectively to constitute non-return valves controlling the flow of liquid through said passages respectively to and from said first cylinder.

7. In a hydraulic brake system, a master cylinder comprising a reserve tank, a first cylinder, means constituting an inlet passage connecting said reserve tank with said first cylinder, a second cylinder, means forming an annular chamber located between said cylinders, means forming a precompression chamber connected with said annular chamber and also forming a delivery passage connecting said annular chamber and said precompression chamber with said first cylinder, interconnected pistons reciprocable within said cylinders, non-return valve means for said inlet passage, and non-return valve means located in said annular chamber for said delivery passage.

8. In a hydraulic brake system, a master cylinder comprising a reserve tank, a first cylinder, means constituting an inlet passage connecting said reserve tank with said first cylinder, a second cylinder, means forming an annular chamber located between said cylinders, means forming a precompression chamber connected with said annular chamber and also forming a delivery passage connecting said annular chamber and said precompression chamber with said first cylinder, pistons reciprocable within said cylinders, a piston element interconnecting said pistons whereby a cylindrical chamber is formed in said first cylinder between the walls thereof and said piston element, non-return valve means located in said cylindrical chamber for said inlet passage, and non-return valve means located in said annular chamber for said delivery passage.

9. In a hydraulic brake system, a master cylinder comprising a reserve tank, a first cylinder, means constituting an inlet passage connecting said reserve tank with said first cylinder, a second cylinder, means forming an annular chamber located betwee said cylinders, means forming a precompression chamber connected with said annular chamber and also forming a delivery passage connecting said annular chamber and said precompression chamber with said first cylinder, pistons reciprocable within said cylinders, a piston element interconnecting said pistons, whereby a cylindrical chamber is formed in said first cylinder between the walls thereof and said piston element, an annular member of resilient material overlying said inlet passage and contituting non-return valve means therefor, and another annular member of resilient material overlying said delivery passage and constituting non-return valve means therefor, at least one of said annular members having an enlarged portion sealing said annular chamber from said cylindrical chamber.

10. In a hydraulic brake system, a master cylinder comprising a reserve tank, a first cylinder, means constituting an inlet passage connecting said reserve tank with said first cylinder, a second cylinder, means forming an annular chamber located between said cylinders, means forming a precompression chamber connected with said annular chamber and also forming a delivery passage connecting said annular chamber and said precompression chamber with said first cylinder, interconnected pistons reciprocable within said cylinders, an annular member of resilient material overlying said inlet passage and constituting non-return valve means therefor, and another annular member of resilient material integral with the first-mentioned member and overlying said delivery passage and constituting non-return valve means therefor.

11. In a hydraulic brake system, a master cylinder comprising a reserve tank, a first cylinder, means constituting an inlet passage connecting said reserve tank with said first cylinder, a second cylinder, means forming an annular chamber located between said cylinders, a cup-shaped member located in said reserve tank and communicating with said annular chamber, a domed cover mounted upon said cup-shaped member whereby the interior of said cup-shaped member and said cover constitute a precompression chamber, an adjustable spring located within said precompression chamber and connecting said cover with said cup-shaped member, means forming a delivery passage connecting said annular chamber with said first cylinder, interconnected pistons reciprocable within said cylinders, non-return valve means for said inlet passage and non-return valve means located in said annular chamber for said delivery passage.

BERNARD NEUMANN.

References Cited in the file of this patent

UNITED STATES PATENTS

| Number | Name | Date |
|---|---|---|
| 2,041,164 | Carroll | May 19, 1936 |
| 2,092,251 | Heidloff | Sept. 7, 1937 |
| 2,137,525 | Carroll | Nov. 22, 1938 |